United States Patent
Sievers et al.

[11] Patent Number: 5,939,666
[45] Date of Patent: Aug. 17, 1999

[54] EVAPORATION FRONT POSITION CONTROL IN ALKALI METAL THERMAL ELECTRIC CONVERSION (AMTEC) CELLS

[75] Inventors: Robert K. Sievers, Ann Arbor; Terry J. Hendricks, Saline; Joseph C. Giglio, Britton, all of Mich.

[73] Assignees: Hitachi Maxell, Ltd., Osaka; Hitachi, Ltd., Tokyo, both of Japan

[21] Appl. No.: 08/877,222

[22] Filed: Jun. 17, 1997

[51] Int. Cl.[6] .................................................. H01L 35/30
[52] U.S. Cl. ...................... 136/205; 136/242; 429/104; 429/112
[58] Field of Search ................................. 136/200, 202, 136/205, 207, 208, 209, 242; 429/5, 11, 50, 104, 112, 120

[56] References Cited

U.S. PATENT DOCUMENTS

| | | | |
|---|---|---|---|
| 4,042,757 | 8/1977 | Jones | 429/104 |
| 4,049,877 | 9/1977 | Saillant et al. | 429/11 |
| 4,098,958 | 7/1978 | Bettman | 429/17 |
| 4,220,692 | 9/1980 | Hunt | 429/104 |
| 4,505,991 | 3/1985 | Weber | 429/11 |
| 4,510,210 | 4/1985 | Hunt | 429/11 |
| 4,808,240 | 2/1989 | Sievers | 136/202 |
| 4,857,421 | 8/1989 | Ernst | 429/104 |
| 5,039,351 | 8/1991 | Cooper et al. | 136/202 |
| 5,085,948 | 2/1992 | Tsukamoto et al. | 429/11 |
| 5,089,054 | 2/1992 | Sievers | 136/202 |
| 5,228,922 | 7/1993 | Sievers | 136/202 |
| 5,441,575 | 8/1995 | Underwood et al. | 136/202 |

OTHER PUBLICATIONS

Schock, A. et al, "Parametric Analyses of AMTEC Multi-tube Cells and Recommedations for Revised Cell Design", pp. 1395–1404, 1997.

Schock, A. et al, "Coupled Thermal, Electrical, and Fluid Flow Analyses of AMTEC Multitube Cell with Adiabatic Side Wall", pp. 1381–1394, 1997. No Month Available.

A. Schock, H. Noravian, C. Or, and V. Kumar; Design and Anaylsis of Radioisotope Power System Based on Revised Multitube AMTEC Cell Design; No Month Available; 1997; pp. 1411–1423.

*Primary Examiner*—Kathryn Gorgos
*Assistant Examiner*—Thomas H Parsons

[57] ABSTRACT

The present invention provides an alkali metal thermal to electric conversion (AMTEC) cell of the type employing an alkali metal flowing between a high-pressure zone and low-pressure zone in the cell through a solid electrolyte structure. According to the invention, the cell preferably includes a condenser communicating with the low-pressure zone for condensing alkali metal vapor migrating through the low-pressure zone from the solid electrolyte structure. A return channel is coupled to the condenser for directing condensed alkali metal from the condenser toward a hot end of the cell. An evaporator is coupled to the return channel for evaporating the condensed alkali metal and communicates with the high-pressure zone. The evaporator includes means for controlling an evaporation front position of the alkali metal in response to variations in the temperature gradient within the cell as caused by load changes on the cell. Such means for controlling the evaporation front position preferably includes a wick having an alkali metal evaporation surface spanning the temperature gradient. For instance, a conically shaped surface diverging toward the hot end of the cell may be employed.

13 Claims, 2 Drawing Sheets

EVAPORATION FRONT POSITION CONTROL IN ALKALI METAL THERMAL ELECTRIC CONVERSION (AMTEC) CELLS

BACKGROUND OF THE INVENTION

1. Technical Field

The present invention generally relates to alkali metal thermal to electric conversion (AMTEC) cells and more particularly to means for controlling the alkali metal evaporation front position in an evaporator of the cell.

2. Discussion

An AMTEC cell is a thermally regenerative concentration cell typically utilizing sodium or potassium as a working fluid and a beta-alumina type solid electrolyte as an ion selective membrane. The electrolyte permits a nearly isothermal expansion of sodium to generate high-current/low voltage power at high efficiency. Most AMTEC cells employ at least one beta-alumina type solid electrolyte (BASE) element which is exposed to high-pressure sodium on an inner surface and low-pressure sodium on an outer surface.

The BASE element's inner and outer surfaces are overlaid with permeable electrodes which are connected to each other through an external load circuit. Neutral sodium atoms incident on the BASE tube's inner surface give up their electrons at the inner electrode (the anode). The resulting sodium ions pass through the tube wall under the applied pressure gradient, and the emerging sodium ions are neutralized at the outer electrode (the cathode) by electrons returning from the external load. Thus, the pressure gradient drives the sodium through the BASE element thereby creating an electrical current which passes through the external load resistance.

The neutral sodium atom vapor leaving the outer electrodes flows through the space between the BASE elements and the cell wall until it condenses at a low-temperature condenser at the cold end of the cell. From there, the sodium condensate flows through an artery containing a fine pore membrane consisting of a densely packed stainless steel wire matrix, similar to those used in heat pipe wicks. The liquid sodium evaporates to a high pressure at the bottom of an evaporator wick which is coupled to the artery membrane. The high-pressure sodium vapor is returned to the insides of the BASE elements through a common plenum at the bottom of the cell.

Some cells employ multiple BASE tubes with sodium vapor on both sides of the tube wall to prevent shorting of the BASE tubes within each cell. The inner surface of each BASE tube is exposed to high-pressure sodium vapor and the outer surface is exposed to low-pressure sodium vapor. The high-temperature evaporator near the hot end of the cell produces the high pressure and the low-temperature condenser at the cold end of the cell maintains the low-pressure.

As the AMTEC cell experiences different operating load conditions and thermal environments, the amount of required current flow changes. In response, the sodium mass flow rates and the temperatures within the cell change significantly. As such, the optimal position within the evaporator for the location of the evaporation front varies. Controlling this sodium evaporation front position within the evaporator over a great range of operating conditions is a critical concern. By controlling the front position, reliable and robust AMTEC cells capable of performing across a broad range of operating load conditions and thermal environments may be produced.

Conventional AMTEC cells only operate at peak performance at a single set of operating conditions which coincide with a single evaporation front position. For instance, the cell may be designed to operate at two amps. At this current, the temperature at the end of the evaporator (e.g., 800° C.) is ideal for sustaining sodium evaporation. However, as the current load increases or decreases, the temperature at the end of the evaporator changes (e.g. ±100° C.). As a result, the position of the liquid/vapor interface (i.e., evaporation front) moves to a new position within the evaporator. This part of the evaporator is at the appropriate temperature for evaporation at that new current or operating condition. However, since this location is no longer at the end of the evaporator, the resulting sodium vapor must migrate through the evaporator wick material before entering the free space below the evaporator. This results in poor cell performance. As such, conventional AMTEC cells are not flexible to changing operating conditions typical of many power conversion/generation applications. In order to compensate, some prior art cells employed evaporator wicks which provided excess wicking capability in an effort to prevent movement of the evaporation front. However, this caused poor AMTEC cell performance due to dramatically reduced sodium vapor pressure and mass flow due to low permeability, or increased cell manufacturing costs to produce very small pore sizes.

In view of the drawbacks of conventional cells, it is desirable to provide an AMTEC cell employing an evaporator capable of accommodating an alkali metal evaporation front position moving in a prescribed, well-characterized manner in response to different alkali metal flow rates and changing thermal conditions, or maintaining alkali metal evaporation front position during different alkali metal flow rates and changing thermal conditions.

SUMMARY OF THE INVENTION

The above and other objects are provided by an alkali metal thermal to electric conversion (AMTEC) cell of the type employing an alkali metal flowing between a high-pressure zone and low-pressure zone in the cell through a solid electrolyte structure. The cell preferably includes a condenser communicating with the low-pressure zone for condensing alkali metal vapor migrating through the low-pressure zone from the solid electrolyte structure. A return channel is coupled to the condenser for directing condensed alkali metal from the condenser toward a hot end of the cell. An evaporator is coupled to the return channel for evaporating the condensed alkali metal to a high pressure and communicates with the high-pressure zone. The evaporator includes means for controlling an evaporation front position of the alkali metal in response to variations in the temperature profiles and gradient within the cell as caused by load changes on the cell. Such means for controlling the evaporation front position preferably includes a wick having an alkali metal evaporation surface spanning the temperature gradient. For instance, a conically shaped surface diverging toward the hot end of the cell may be employed.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards means for controlling the movement of an evaporation front position of alkali metal working fluid within an evaporator of an alkali metal thermal to electric conversion (AMTEC) cell. As the AMTEC cell experiences different operating load conditions and thermal environments, the amount of current flow and, therefore, alkali metal mass flow rates change significantly. In conjunction with the changing mass flow rate, there is a corresponding change in the temperature profiles and gradients within the cell such that the portion of the evaporator at the appropriate temperature for alkali metal working fluid evaporation varies. Thus, as the flow rate and temperature changes, the optimum position of the evaporation front changes. By providing a surface for evaporation into free space adjacent the moving evaporation position, the power conversion performance of the AMTEC cell is enhanced over a broad range of thermal and electrical operating conditions.

Figure 1:
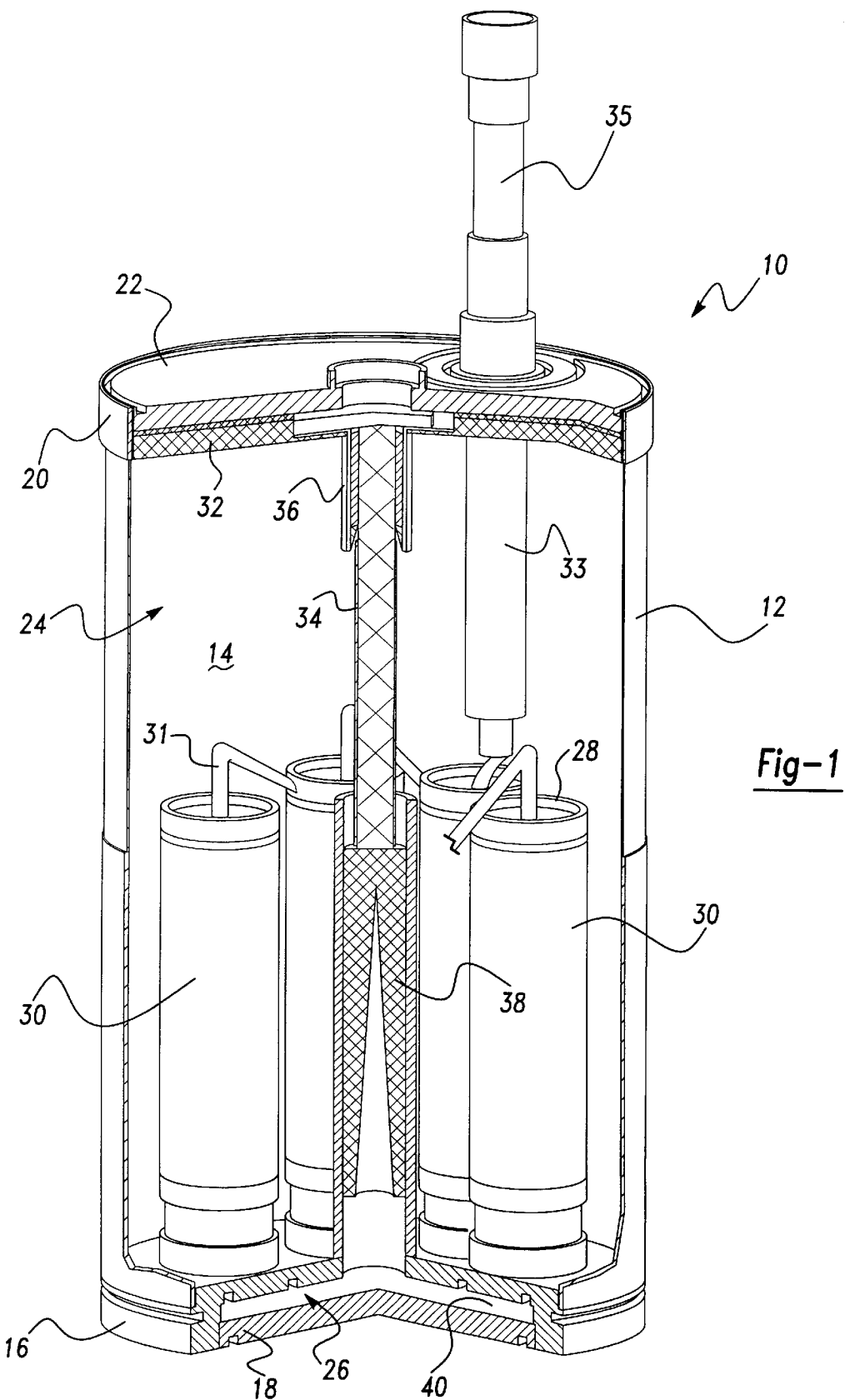
FIG. 1 is a perspective view in partial cross-section of an AMTEC cell having an evaporator incorporating the teachings of the present invention.

Turning now to the figures, an AMTEC cell incorporating the teachings of the present invention is illustrated in FIG. 1 and indicated generally at 10. The AMTEC cell 10 generally includes a cell wall 12 defining a chamber 14 which is closed at a first end 16 by a first end cap 18. The first end 16 is generally known in the art as the hot end of the cell 10. The chamber 14 is also closed at a second end 20 by a second end cap 22. The second end 20 is generally known in the art as the cold end of the cell 10.

The chamber 14 is separated into a low-pressure zone 24 and a high pressure zone 26 by a solid electrolyte structure 28. In the illustrated embodiment, the solid electrolyte structure 28 includes a plurality of beta-alumina solid electrolyte (BASE) tubes 30 electrically connected in series by leads 31. Although the BASE tubes 30 are shown, it is to be understood that the present invention is also suitable for use in conjunction with solid electrolyte structures of other configurations. The leads 31 form a path to an electrical conductor 33 extending to a terminal 35 at the cold end of the cell 20.

A condenser 32 is disposed in, and therefore communicates with, the low-pressure zone 24. As can be seen, the condenser 32 is coupled to the cell wall 12 about its periphery adjacent the second end cap 22. An artery return channel 34 packed with metallic felt is coupled to the condenser 32 by a mounting member 36. The return channel 34 extends from the condenser 32 through the low-pressure zone 24 towards the hot end 16 of the cell 10.

The return channel 34 is connected to an evaporator 38 which communicates with the high-pressure zone 26. A common plenum 40 adjacent the hot end 16 of the cell 10 interconnects the evaporator 38 and the high-pressure side of the solid electrolyte structure 28. An alkali metal working fluid, such as sodium, is disposed within the cell 10. A further description of AMTEC cells may be found in U.S. Pat. No. 4,808,240 to Robert K. Sievers which is hereby expressly incorporated by reference herein.

In operation, neutral sodium atoms incident on the high pressure side of the electrolyte structure 28 release their electrons to an inner electrode. The resulting sodium ions pass through the solid electrolyte structure 28 under an applied pressure gradient and the emerging sodium ions are neutralized at an outer electrode by electrons returning from the external load. The neutral sodium atom vapor leaving the outer electrode migrates through the low-pressure zone 24 and condenses at the condenser 32. The sodium condensate flows downward through the return channel 34 to the evaporator 38. The liquid sodium evaporates at the evaporator 38 and the high-pressure sodium vapor is returned to the high-pressure side of the solid electrolyte structure 28 through the plenum 40.

Figure 2:
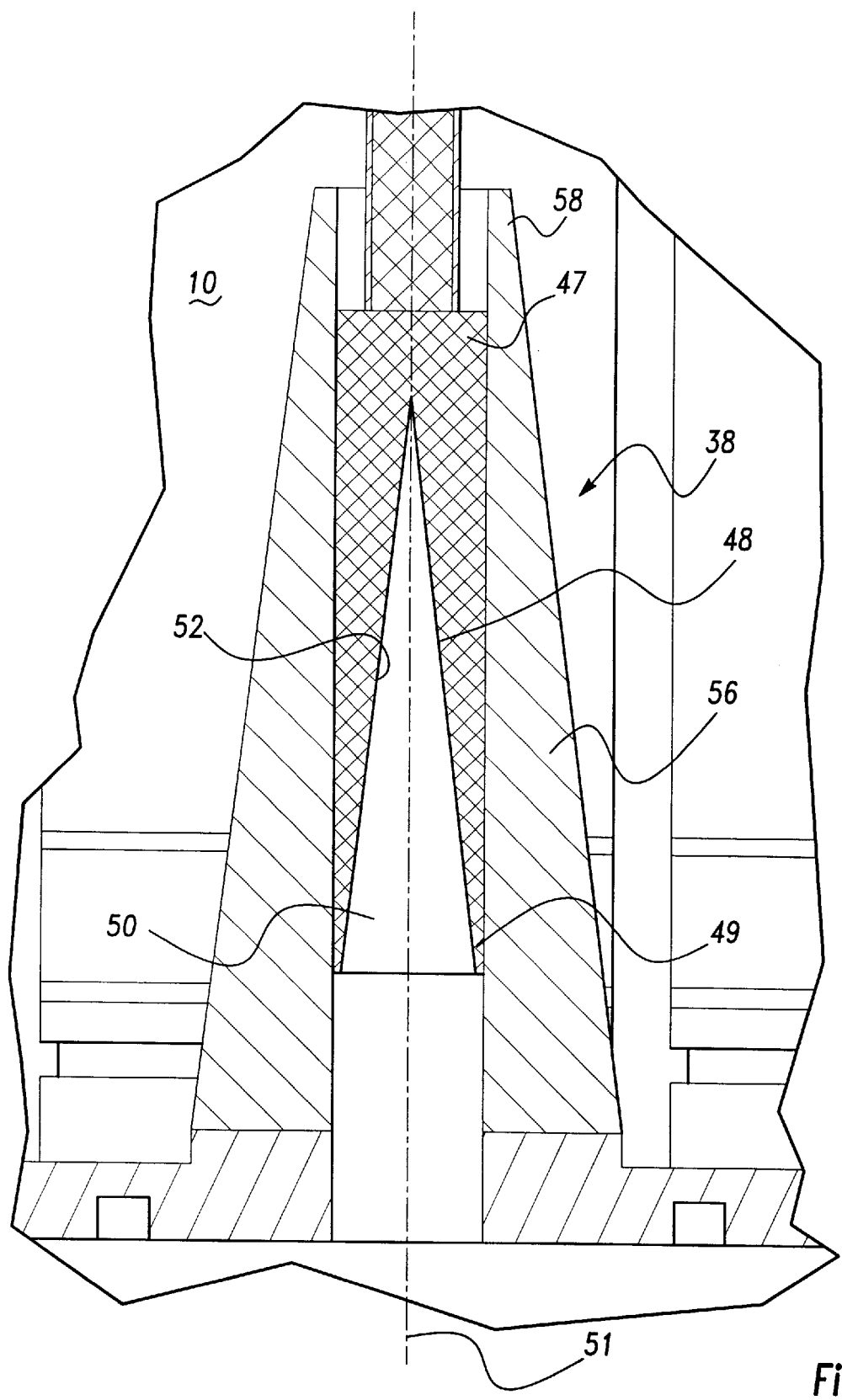
FIG. 2 is a more detailed view in cross-section of the evaporator including means for controlling an evaporation front position of the alkali metal working fluid of the AMTEC cell.

Turning now to FIG. 2, the evaporator 38 is shown in greater detail. The evaporator 38 includes a tapered wick 48 preferably formed of metallic felt and having non-uniform cross-sectional shape for alkali-metal evaporation from a first end 47 to a second end 49. The tapered wick 48 is shaped generally as an elongated right cylinder having a conical opening 50 therein aligned along the longitudinal axis 51 which spans a temperature gradient within the cell. An evaporation surface 52 is formed by the surface of the wick 48 defining the opening 50.

Due to its non-uniformity, the tapered wick 48 dynamically changes its effective area for alkali metal evaporation as the alkali metal mass flow requirements change inside the cell 10. That is, as the evaporation front moves toward the hot end 16 of the cell 10 due to changes in the temperature gradient within the cell from changing power output requirements, a greater amount of surface area of the evaporation surface 52 is available for evaporation. Additionally, a lesser amount of wick material is present for sodium conduction. Similarly, as the evaporation front moves toward the cold end 20 of the cell 10, a smaller amount of surface area of the evaporation surface 52 is available for evaporation and a greater amount of wick material is present for sodium conduction. In either case, surface area for evaporation is always available adjacent the evaporation front position. This enhances the power output of the cell over a broad range of operating conditions.

It should be noted that although a tapered wick is illustrated, other configurations for increasing the evaporator surface area are contemplated. Although not to be interpreted as limiting, these configurations may include a single or a plurality of axial bores, hemispheres, and/or parabolas.

The tapered wick 48 enables the alkali metal evaporation front to dynamically move to different positions in response to changing thermal conditions imposed on the evaporator. In this way, the evaporation front resides at a location along the wick 48 at the appropriate evaporator temperature. This temperature is set through the selection of evaporator pore size and liquid surface tension. The pores are sized to resist the vapor pressure of the desired temperature, but cannot resist the pressure generated at a higher temperature. As more current is required from the cell, the temperature of the second end 49 of the evaporator 38 decreases. This, in turn, causes the evaporation front to move towards higher temperature regions closer to the hot end 16 of the cell 10. As less current is required from the cell, the temperature at the second end 49 of the evaporator increases. This, in turn, causes the evaporation front to move towards lower temperature regions farther from the hot end 16 of the cell 10. According to the present invention, an evaporation surface spans the temperature gradient so that a surface adjacent free space is always provided next to the evaporation front regardless of its migration.

As illustrated in FIG. 2, the evaporator 38 is enclosed by an evaporator wall 56 tapering from a thick region near the hot end 16 of the cell 10 to a thin region at an opposite end 58. The non-uniform shape of the wall 56 varies the thermal conductivity to the evaporator 38 along its length. As the evaporation front moves toward higher temperature regions closer to the hot end 16 of the cell 10, the front moves proximate a thick portion of the evaporator wall 56. The thicker wall has higher thermal conductance and more efficiently moves higher heat flows to the evaporation front. This supports higher alkali metal evaporation rate requirements. As the evaporation front moves toward lower temperature regions farther from the hot end 16 of the cell 10, the front moves proximate a portion of the evaporator wall 56 having a thinner configuration. The thinner wall has lower thermal conductance, thereby reducing the heat transfer to the evaporation front to balance the lower alkali metal evaporation rate requirements. Although the tapered wall 56 has been depicted, other configurations are contemplated, such as, but not limited to, fins, corrugations, and inverted cones among others.

Thus, the present invention provides means for controlling an evaporation front position of alkali metal working fluid in an AMTEC cell according to variations in the temperature gradient within the cell. This enables the alkali metal evaporation front to move to a location of optimal temperature within the evaporator. As such, the power conversion process of the AMTEC cell is enhanced over a broad range of thermal and electrical operating conditions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An alkali metal thermal to electric conversion (AMTEC) cell employing an alkali metal flowing between a hot end of the cell and a cold end of the cell through a solid electrolyte structure which separates the cell into a low-pressure zone and a high-pressure zone, said cell comprising:
   a condenser communicating with said low-pressure zone for condensing alkali metal vapor migrating through said low-pressure zone from said solid electrolyte structure;
   a return channel coupled to said condenser for directing said condensed alkali metal from said condenser toward said hot end of the cell; and
   an evaporator coupled to said return channel and communicating with said high-pressure zone for evaporating said condensed alkali metal into said high-pressure zone, said evaporator including an evaporation surface spanning a temperature gradient for enabling changes in an evaporation front position of said alkali metal within a range from an end of said evaporator to a position displaced from said end toward said return channel according to changes in said temperature gradient in said cell.

2. The AMTEC cell of claim 1 wherein said evaporator further comprises a wick having a non-uniform cross-sectional area for accommodating said evaporation front at different locations along its length.

3. The AMTEC cell of claim 2 wherein said wick further comprises an elongated alkali metal evaporation surface opening toward said hot end of said cell.

4. The AMTEC cell of claim 2 wherein said wick is generally shaped as a right cylinder including a conically shaped opening therein aligned along a longitudinal axis of said cylinder, and wherein said evaporation surface is defined by a surface of said wick adjacent said opening.

5. The AMTEC cell of claim 2 wherein said wick further comprises a plurality of bores formed along its length opening towards said hot end of said cell.

6. The AMTEC cell of claim 1 further comprising an evaporator wall having a non-uniform cross-sectional shape encompassing said evaporator for varying a thermal conductance property of said wall along its length.

7. The AMTEC cell of claim 6 wherein said evaporator wall includes a first wall region diverging to a thicker second wall region, said second wall region being located closer to said hot end of said cell than said first wall region.

8. The AMTEC cell of claim 7 wherein said evaporator wall is generally shaped as a truncated cone including a cylindrically shaped axial bore therein.

9. The AMTEC cell of claim 1 further comprising:
   a tapered wick having a non-uniform cross-sectional area for accommodating said evaporation front at different locations along its length; and
   an evaporator wall substantially surrounding said tapered wick, said wall having a non-uniform cross-sectional shape for varying a thermal conductance property of said wall along its length.

10. The AMTEC cell of claim 1 further comprising:
    a tapered wick including said alkali metal evaporation surface therein, said evaporation surface opening toward said hot end of said cell; and
    an evaporator wall substantially surrounding said evaporator, said wall having a taper including a first wall region diverging to a thicker second wall region, said second wall region being located closer to said hot end of said cell than said first wall region.

11. An alkali metal thermal to electric conversion (AMTEC) cell employing an alkali metal flowing between a hot end of the cell and a cold end of the cell through a solid electrolyte structure which separates the cell into a low-pressure zone and a high-pressure zone, said cell comprising:
    a condenser communicating with said low-pressure zone for condensing alkali metal vapor migrating through said low-pressure zone from said solid electrolyte structure;
    a return channel coupled to said condenser for directing said condensed alkali metal from said condenser toward said hot end of the cell; and
    an evaporator coupled to said return channel and communicating with said high-pressure zone for evaporating said condensed alkali metal into said high-pressure zone, said evaporator including a wick having a conically shaped alkali metal evaporation surface spanning a temperature gradient between said hot end and said cold end of said cell for controlling an evaporation front position of said alkali metal according to variations in a temperature gradient within said cell.

12. The AMTEC cell of claim 11 further comprising an evaporator wall substantially surrounding said evaporator, said wall having a non-uniform cross-sectional shape for varying a thermal conductance property of said wall along its length.

13. The AMTEC cell of claim 11 further comprising:
    an evaporator wall substantially surrounding said evaporator, said wall having a taper including a first wall region diverging to a thicker second wall region, said thicker second wall region being located closer to said hot end of said cell than said thin wall region.

* * * * *

UNITED STATES PATENT AND TRADEMARK OFFICE
CERTIFICATE OF CORRECTION

PATENT NO. : 5,939,666  Page 1 of 1
DATED : August 17, 1999
INVENTOR(S) : Robert K. Sievers, Terry J. Hendricks and Joseph C. Giglio It is certified that error appears in the above-identified patent and that said Letters Patent is hereby corrected as shown below:

Title page,
Item [73], Assignees, delete "Hitachi Maxell, Ltd., Osaka; Hitachi, Ltd., Tokyo, both of Japan" and insert -- Advanced Modular Systems, Inc., Ann Arbor, Mich. --.

Signed and Sealed this

Eighteenth Day of May, 2004

JON W. DUDAS
*Acting Director of the United States Patent and Trademark Office*